United States Patent
Toscano (10) Patent No.: US 12,388,844 B2
(45) Date of Patent: Aug. 12, 2025

(54) DETECTING A TCP SESSION HIJACKING ATTACK

(71) Applicant: Telefonaktiebolaget LM Ericsson (publ), Stockholm (SE)

(72) Inventor: Orazio Toscano, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 262 days.

(21) Appl. No.: 18/039,892

(22) PCT Filed: Dec. 16, 2020

(86) PCT No.: PCT/EP2020/086564
§ 371 (c)(1),
(2) Date: Jun. 1, 2023

(87) PCT Pub. No.: WO2022/128088
PCT Pub. Date: Jun. 23, 2022

(65) Prior Publication Data
US 2024/0015170 A1 Jan. 11, 2024

(51) Int. Cl.
*H04L 9/40* (2022.01)
(52) U.S. Cl.
CPC ...... *H04L 63/1416* (2013.01); *H04L 63/1466* (2013.01)
(58) Field of Classification Search
CPC .................. H04L 63/1416; H04L 63/1466
See application file for complete search history.

(56) References Cited

U.S. PATENT DOCUMENTS

| 6,792,546 B1 | 9/2004 | Shanklin et al. |
| 7,936,687 B1 * | 5/2011 | Parker ............... H04L 12/56 709/224 |

(Continued)

FOREIGN PATENT DOCUMENTS

| CN | 104125121 A | 10/2014 |
| CN | 106953833 A | 7/2017 |

(Continued)

OTHER PUBLICATIONS

Barry, B. et al., "A Cross-protocol approach to detect TCP Hijacking attacks", 2007 IEEE International Conference on Signal Processing and Communications (ICSPC 2007), Nov. 24-27, 2007, Dubai, United Arab Emirates, pp. 57-60, IEEE.

(Continued)

*Primary Examiner* — Richard G Keehn
(74) *Attorney, Agent, or Firm* — Sonoda & Kobayashi Intellectual Property Law; Sarvajit S. Patil (57) ABSTRACT

A computing system (500) is configured to detect a Transmission Control Protocol (TCP) session hijacking attack on a TCP session. In particular, the computing system monitors for nonsequential packets of the TCP session. The nonsequential packets each comprise a sequence number (220) that is different from a next expected sequence number of the TCP session. The computing system (500) calculates, for each of a plurality of time intervals, a variation metric representing an extent to which the sequence numbers (220) of the nonsequential packets received in the time interval differ from the next expected sequence number. The computing system determines a variation baseline representing a trend of the variation metrics over time, and detects the TCP session hijacking attack on the TCP session based on the variation metric in a given time interval being different from the variation baseline by less than a threshold.

21 Claims, 8 Drawing Sheets

(56) References Cited

U.S. PATENT DOCUMENTS

| | | | |
|---|---|---|---|
| 8,239,942 B2 | 8/2012 | Shanklin et al. | |
| 9,942,787 B1* | 4/2018 | Tillotson | H04W 24/08 |
| 2003/0051026 A1 | 3/2003 | Carter et al. | |
| 2005/0210533 A1* | 9/2005 | Copeland | H04L 63/1416 726/23 |
| 2009/0019537 A1* | 1/2009 | Stavrou | H04L 63/1416 726/13 |
| 2013/0166960 A1* | 6/2013 | Das | H04L 43/50 714/E11.159 |
| 2015/0029863 A1* | 1/2015 | Lai | H04L 47/27 370/237 |
| 2018/0270197 A1* | 9/2018 | Subramanian | H04L 63/1416 |
| 2018/0278632 A1* | 9/2018 | Fu | H04L 63/1416 |
| 2020/0092218 A1* | 3/2020 | Flomen | H04L 65/80 |
| 2023/0353221 A1* | 11/2023 | Djordjevic | H04B 17/318 |

FOREIGN PATENT DOCUMENTS

| | | | |
|---|---|---|---|
| CN | 109474587 A | 3/2019 | |
| WO | WO-2008106084 A1 * | 9/2008 | H04L 63/1408 |

OTHER PUBLICATIONS

Lopez, D. et al., "Framework for Interface to Network Security Functions", Internet Engineering Task Force (IETF), RFC 8329, Feb. 2018, pp. 1-25, Internet Engineering Task Force (IETF).

Statista, "Amount of monetary damage caused by reported cyber crime to the IC3 from 2001 to 2019 (in million U.S. dollars)", FBI; IC3: US Department of Justice, 2020, pp. 1, Statista.

Hares, S. et al., "Interface to Network Security Functions (I2NSF) : Problem Statement and Use Cases", Internet Engineering Task Force (IETF), RFC 8192, Jul. 2017, pp. 1-29, Internet Engineering Task Force (IETF).

Du, W. "Chapter 13: Attacks on the TCP Protocol", Internet Security: A Hands-on Approach, Second Edition, 2019, pp. 29-52, Seed.

Clement, J., "IC3: total damage caused by reported cyber crime 2001-2019", Statista, Mar. 27, 2020, pp. 1-2, Statista.

* cited by examiner

DETECTING A TCP SESSION HIJACKING ATTACK

TECHNICAL FIELD

This application generally relates to the field of computer network security, and more particularly relates to detecting a Transmission Control Protocol (TCP) session hijacking attack between communication endpoints in a communication network.

BACKGROUND

TCP is a session-based protocol that builds on Internet Protocol (IP) to exchange data between endpoints on a network. To establish a TCP session, the endpoints engage in a three-way handshake procedure. Once the TCP session has been established, the TCP session can be used by the endpoints to send data to each other using TCP packets.

A TCP session hijacking attack traditionally involves manufacturing a TCP packet in an attempt to get an endpoint of the session to accept the TCP packet as having been genuinely sent by the other endpoint of the session. This is often called "spoofing" a TCP packet. If a spoofed packet is accepted as genuine, a malicious third party (sometimes referred to as a "man-in-the-middle") may be able to disrupt operations on the network. For example, the spoofed packet may include commands to reboot, shut down, or delete data, among other things. Detecting that a TCP session hijacking attack is occurring is often important, or even critical, to avoiding disruption.

SUMMARY

Embodiments of the present disclosure generally relate to detecting a TCP session hijacking attack.

An example embodiment includes a method of detecting a TCP session hijacking attack on a TCP session. The method is implemented by a computing system. The method comprises monitoring for nonsequential packets of the TCP session. The nonsequential packets each comprise a sequence number that is different from a next expected sequence number of the TCP session. The method further comprises calculating, for each of a plurality of time intervals, a variation metric representing an extent to which the sequence numbers of the nonsequential packets received in the time interval differ from the next expected sequence number. The method further comprises determining a variation baseline representing a trend of the variation metrics over time. The method further comprises detecting the TCP session hijacking attack on the TCP session based on the variation metric in a given time interval being different from the variation baseline by less than a threshold.

In some embodiments, calculating the variation metric for each of the plurality of time intervals comprises calculating a mean difference between the next expected sequence number and the sequence numbers of the nonsequential packets received in the time interval, or a modal difference between the next expected sequence number and the sequence numbers of the nonsequential packets received in the time interval. In some such embodiments, the method further comprises calculating both the mean difference and the modal difference for each of the time intervals. In some such embodiments, the method further comprises comparing the mean difference and the modal difference of the given time interval to the mean difference and the modal difference of at least one time interval previous to the given time interval.

In some embodiments, the plurality of time intervals further comprises one or more time intervals subsequent to the given time interval. Moreover, detecting the TCP session hijacking attack on the TCP session is further based on the variation metric in the subsequent time intervals being different from the variation baseline by less than the threshold. In some such embodiments, detecting the TCP session hijacking attack is further based on the variation metric being different from the variation baseline by less than the threshold for more than a configurable number of the time intervals.

In some embodiments, the method further comprises commencing the calculating of the variation metric for each of the plurality of time intervals in response to detecting that, in a time interval preceding the plurality of time intervals, more than a threshold number of the nonsequential packets was received. In other embodiments, the method further comprises commencing the calculating of the variation metric for each of the plurality of time intervals in response to detecting that, in a time interval preceding the plurality of time intervals, the nonsequential packets received for the TCP session are greater in number than for one or more other TCP sessions by a threshold amount.

In some embodiments, the method further comprises refraining from calculating the variation metric for one or more time intervals in which sequence number variation is different from the variation baseline by more than the threshold. In some such embodiments, the refraining from calculating the variation metric for the one or more time intervals in which the sequence number variation is different from the variation baseline by more than the threshold is responsive to the sequence number variation being different from the variation baseline for at least a configurable number of consecutive time intervals.

Other embodiments include a computing system configured to monitor for nonsequential packets of a TCP session. The nonsequential packets each comprise a sequence number that is different from a next expected sequence number of the TCP session. The computing system is further configured to calculate, for each of a plurality of time intervals, a variation metric representing an extent to which the sequence numbers of the nonsequential packets received in the time interval differ from the next expected sequence number. The computing system is further configured to determine a variation baseline representing a trend of the variation metrics over time. The computing system is further configured to detect a TCP session hijacking attack on the TCP session based on the variation metric in a given time interval being different from the variation baseline by less than a threshold.

In some embodiments, the computing system is further configured to perform any of the methods discussed above.

In particular, in some embodiments, the computing system comprises interface circuitry configured to receive the plurality of packets of the TCP session. The computing system further comprises processing circuitry whereby the computing system is configured as noted above. The processing circuitry is communicatively coupled to the interface circuitry.

In some embodiments, to calculate the variation metric for each of the plurality of time intervals, the processing circuitry is configured to calculate a mean difference between the next expected sequence number and the sequence numbers of the nonsequential packets received in the time interval, or a modal difference between the next expected sequence number and the sequence numbers of the nonsequential packets received in the time interval. In some such embodiments, the processing circuitry is further configured to calculate both the mean difference and the modal difference for each of the time intervals. In some such embodiments, the processing circuitry is further configured to compare the mean difference and the modal difference of the given time interval to the mean difference and the modal difference of at least one time interval previous to the given time interval.

In some embodiments, the plurality of time intervals further comprises one or more time intervals subsequent to the given time interval, and the processing circuitry is further configured to detect the TCP session hijacking attack on the TCP session based on the variation metric in the subsequent time intervals being different from the variation baseline by less than the threshold. In some such embodiments, the processing circuitry is further configured to detect the TCP session hijacking attack based on the variation metric being different from the variation baseline by less than the threshold for more than a configurable number of the time intervals.

In some embodiments, the processing circuitry is further configured to commence the calculating of the variation metric for each of the plurality of time intervals in response to detecting that, in a time interval preceding the plurality of time intervals, more than a threshold number of the nonsequential packets was received. In other embodiments, the processing circuitry is further configured to commence the calculating of the variation metric for each of the plurality of time intervals in response to detecting that, in a time interval preceding the plurality of time intervals, the nonsequential packets received for the TCP session are greater in number than for one or more other TCP sessions by a threshold amount.

In some embodiments, the processing circuitry is further configured to refrain from calculating the variation metric for one or more time intervals in which sequence number variation is different from the variation baseline by more than the threshold. In some such embodiments, the processing circuitry is further configured to refrain from calculating the variation metric for the one or more time intervals in which the sequence number variation is different from the variation baseline by more than the threshold in response to the sequence number variation being different from the variation baseline for at least a configurable number of consecutive time intervals.

Other embodiments include a computer program, comprising instructions which, when executed on processing circuitry of a computing system, cause the processing circuitry to carry out any of the methods discussed above.

Yet other embodiments include a carrier containing such a computer program. The carrier is one of an electronic signal, optical signal, radio signal, or computer readable storage medium.

Any of the embodiments discussed above may additionally or alternatively include one or more features as discussed in greater detail below.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of an endpoint 110, generally, as opposed to discussion of particular instances of endpoints 110a, 110b).

DETAILED DESCRIPTION

Embodiments of the present disclosure generally relate to detecting a TCP session hijacking attack. According to various embodiments, detection of a TCP session hijacking attack is based on an evaluation of the sequence numbers of packets received in order to detect an aberration that appears not to be naturally occurring. For example, packets that are frequently out-of-sequence to the same extent can serve as an indicator that an attack is occurring in some embodiments. Particular embodiments include evaluating sequence number behavior over time (e.g., over a plurality of time intervals) to look for deviances from baseline behavior. One or more of the embodiments described herein also leverage techniques for performing such evaluation in a computationally efficient manner, which can enable the embodiment to be scaled to handle relatively higher amounts of packet traffic and/or higher numbers of concurrent TCP sessions.

Figure 1:
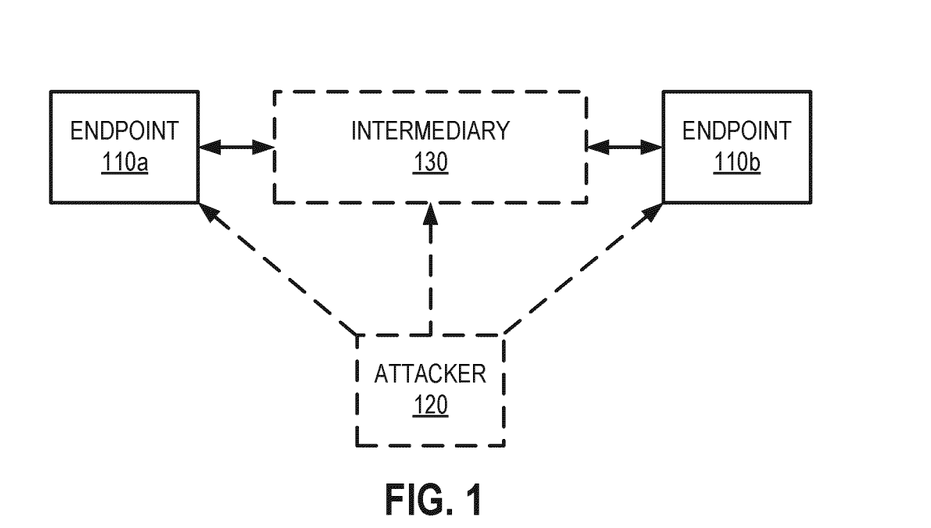
FIG. 1 is a schematic block diagram illustrating an example network, according to one or more embodiments of the present disclosure.

FIG. 1 is a schematic block diagram illustrating an example network 100. The network 100 comprises endpoints 110a, 110b. The endpoints 110a, 110b are computing systems that exchange packets with each other using one or more established TCP sessions. In each TCP session, one of the endpoints 110a, 110b sends a stream of one or more packets to the other. In some embodiments, the network 100 further comprises an intermediary 130 via which one or more of the packets between the endpoints 110a, 110b are exchanged.

In some embodiments, the network 100 further comprises an attacker 120. The attacker 120 in this example is a computing system that sends one or more spoofed packets to either or both of the endpoints 110a, 110b as part of a TCP session hijacking attack. Each spoofed packet may be sent an endpoint 110a, 110b directly or via the intermediary 130 in an attempt to inject the spoofed packet into the established TCP session.

Typical examples of the computing systems illustrated in FIG. 1 include a server computer, a server cluster, a personal computer, a laptop computer, a desktop computer, a workstation, a smartphone, a tablet computer, a wearable computer, a smart appliance, network attached storage, a storage area network, a router, a gateway, and/or a switch.

The network 100 further includes one or more signaling mediums (e.g., wires, cables, buses, radio carriers) that interconnect the elements of FIG. 1 and are suitable for carrying the above-discussed packets. Examples of the network 100 include (but are not limited to) one or more of: the Internet (or a portion thereof); one or more local area networks; one or more wireless networks; one or more cellular networks; one or more Ethernet networks; and/or one or more wired networks. Such a network 100 may comprise any number of other computing devices such as routers, gateways, switches, hubs, firewalls, and the like that support the exchange of such communication signals (not shown).

Although each of the elements illustrated in the example of FIG. 1 has been described as a computing system, it should be noted that one or more of the elements illustrated in FIG. 1 may, according to other embodiments, be a software entity executing on a computing system. Indeed, in at least some such alternative embodiments, one or more of the elements illustrated in FIG. 1 may execute on the same computing system, e.g., as 3GPP virtualized network functions, virtual machines, or other software entities.

Figure 2:
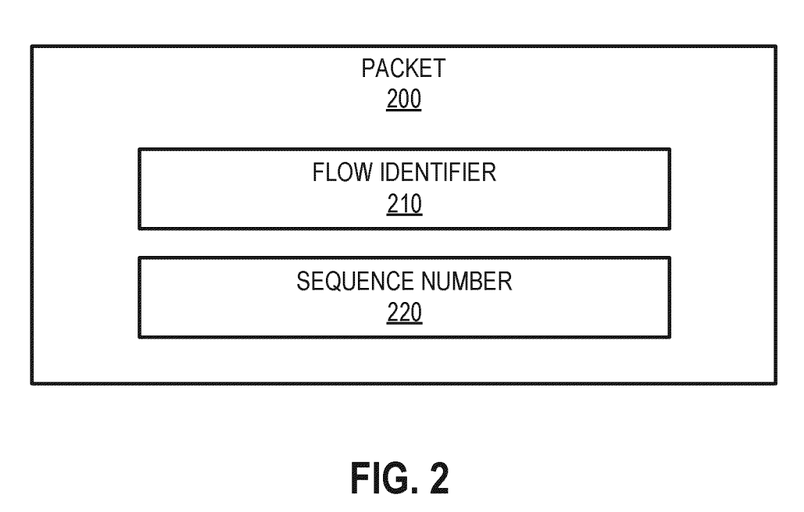
FIG. 2 is a schematic block diagram illustrating an example packet, according to one or more embodiments of the present disclosure.

FIG. 2 is a schematic block diagram illustrating an example packet 200, according to one or more embodiments of the present disclosure. The packet 200 comprises a flow identifier 210 and a sequence number 220. The sequence number 220 is a value that identifies the position of the packet 200 within a stream of packets from one of the endpoints 110a, 110b to the other that are part of the TCP session. The flow identifier 210 is a value (or combination of values) that identifies a TCP session established between the endpoints 110a, 110b.

The packet 200 may, for example, be a traditional TCP/IP packet in which an IP packet encapsulates a TCP packet. Accordingly, the packet 200 may comprise both an IP header and a TCP header (not shown in FIG. 2). For example, the packet 200 conforms to IPv6 standards. In at least some such embodiments, the flow identifier 210 may be a flow label in the IP header of the packet 200. Alternatively, the packet 200 may conform to IPv4 standards. In at least some such embodiments, the flow identifier 210 may be a collection of header values found in the IP and TCP headers. For example, the flow identifier 210 may be a 4-tuple that comprises source and destination IP addresses comprised in the IP header, and source and destination ports comprised in the TCP header.

The packet 200 may have genuinely been sent by one of the endpoints 110a, 110b, or it may be a spoofed packet sent by the attacker 120. To generate a spoofed packet 200, the attacker 120 attempts to set the sequence number 220 and flow identifier 210 to values that one of the endpoints 110a, 110b will accept and treat as genuine. In general, an endpoint 110 will not accept a packet 200 as genuine if the flow identifier 210 does not match an established session and the sequence number 220 is outside of a limited range of acceptable values. While an attacker 120 may not definitively know what flow identifier and sequence number values will be accepted by an endpoint 110, the attacker 120 may attempt to guess or predict such values.

Figure 3:
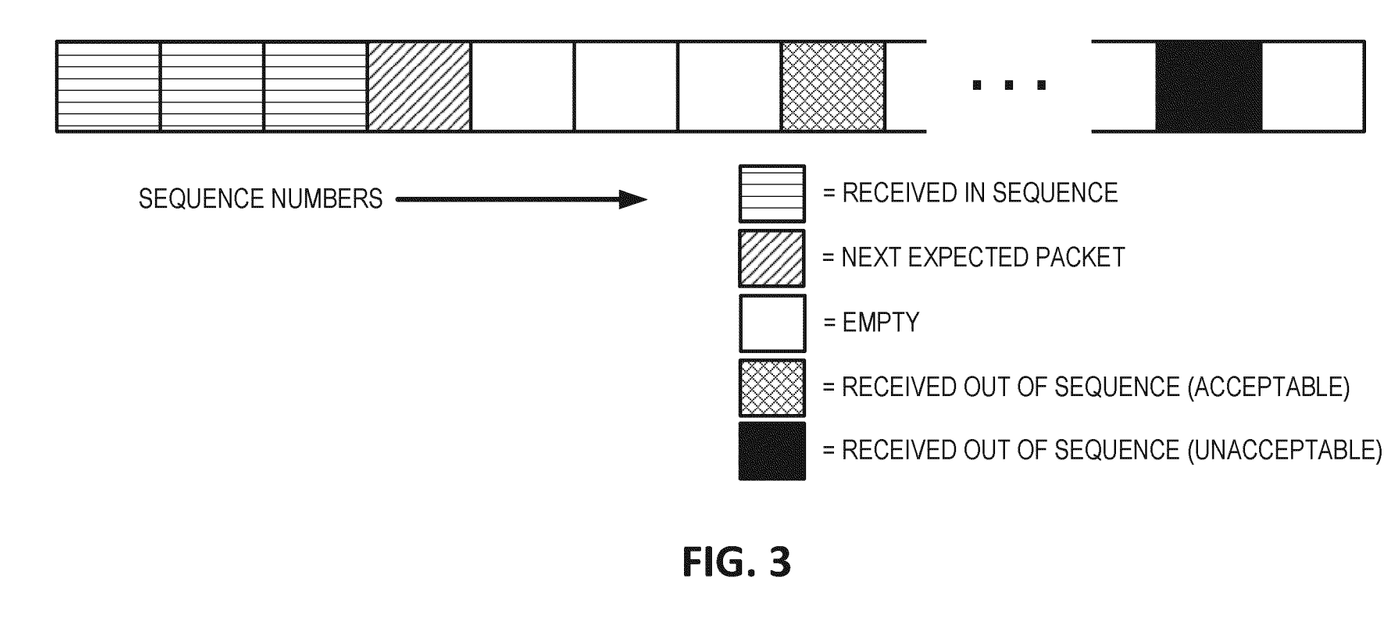
FIG. 3 is a schematic block diagram illustrating different categories of packets of an established TCP session, according to one or more embodiments of the present disclosure.

FIG. 3 is a schematic block diagram that illustrates different categories of packets 200 having a flow identifier 210 of an established TCP session that may be acceptable (e.g., by an endpoint 110 or intermediary 130) based on their sequence number 220. In this regard, each block in FIG. 3 is associated with a corresponding sequence number. A packet 200 having a sequence number 220 that is the same as the next expected packet may raise little to no alarm, according to embodiments. However, a nonsequential packet (i.e., a packet 200 that includes a sequence number 220 that is different from the next expected sequence number) may or may not be accepted.

TCP generally accommodates the reception of packets out-of-sequence, and there are legitimate reasons why a packet 200 that is genuinely part of a TCP session may be received with a sequence number 220 that differs from that of the next expected packet. For example, network congestion may cause packets 200 traversing different paths in the network 100 to experience different amounts of delay, such that a nonsequential packet 200 arrives before the next expected packet. As another example, the next expected packet may have been dropped by the network 100 at some point in transit due to network conditions.

Notwithstanding, while such network conditions may explain a relatively small difference between the sequence number of a genuine received packet, such conditions generally cannot account for a sequence number difference that is quite large. Moreover, although a packet 200 is not necessarily a spoofed packet or other indicator of attack simply because the packet 200 is out-of-sequence to a large degree, it may nonetheless be more advantageous for the receiver to simply drop the packet than to buffer the packet (and occupy memory) indefinitely until the large number of intervening packets in the stream arrive. In this regard, a computing system may maintain a buffer for retaining acceptable packets 200 having sequence numbers that fall within a particular range. These buffered packets may be removed from the buffer after they have been processed as a genuine part of the TCP stream. That said, the computing system may refrain from storing packets 200 having sequence numbers that fall outside of this range in the buffer. Indeed, such packets 200 may, e.g., be silently discarded or otherwise treated as undesirable.

Because a packet 200 comprising a sequence number that is different from a next expected sequence number of the TCP session may or may not be genuine, a computing system receiving such a packet 200 may evaluate one or more additional factors to determine the manner in which such an out-of-sequence packet will be treated. In particular, embodiments of the present disclosure may evaluate whether the sequence number of the packet 200 appears to be the product of typical network conditions, or whether the sequence number appears to be a product of packet spoofing.

Embodiments of the present disclosure take into account that, while normal network operations may result in TCP received sequence numbers jumps that are acceptable (e.g., if the jump is within the size of a TCP stream's receiving buffer), the N-minute integrated mean value and modal value of such jumps for genuine packets under such conditions tends not to be constant. In contrast, during a TCP session hijacking attack, the mean and/or modal value of sequence number jumps tend to be more constant than usual.

One reason these sequence number jumps tend to be more constant during an attack is because a malicious attacker 120 is attempting to guess at an acceptable sequence number range that typically changes in a generally constant way. For example, the TCP stream may comprise media being streamed between endpoints 110 at a constant bitrate. Under such circumstances, the expected sequence number of that TCP stream may generally change at a correspondingly constant rate. An attacker 120 using tools to guess or predict a sequence number that is acceptable for that stream often also shifts its guesses over time at a constant rate. Thus, the attacker 120 is building into its prediction some factor that it believes represents how much the stream is genuinely changing over time, and spoofed packets produced by such predictions may tend to produce sequence number jumps that are also fairly constant. That is, attackers 120 may tend to produce packets 200 that are out-of-sequence to the same extent repeatedly. Particular embodiments of the present disclosure detect a TCP session hijacking attack by identifying this kind of sequence number behavior.

Figure 4:
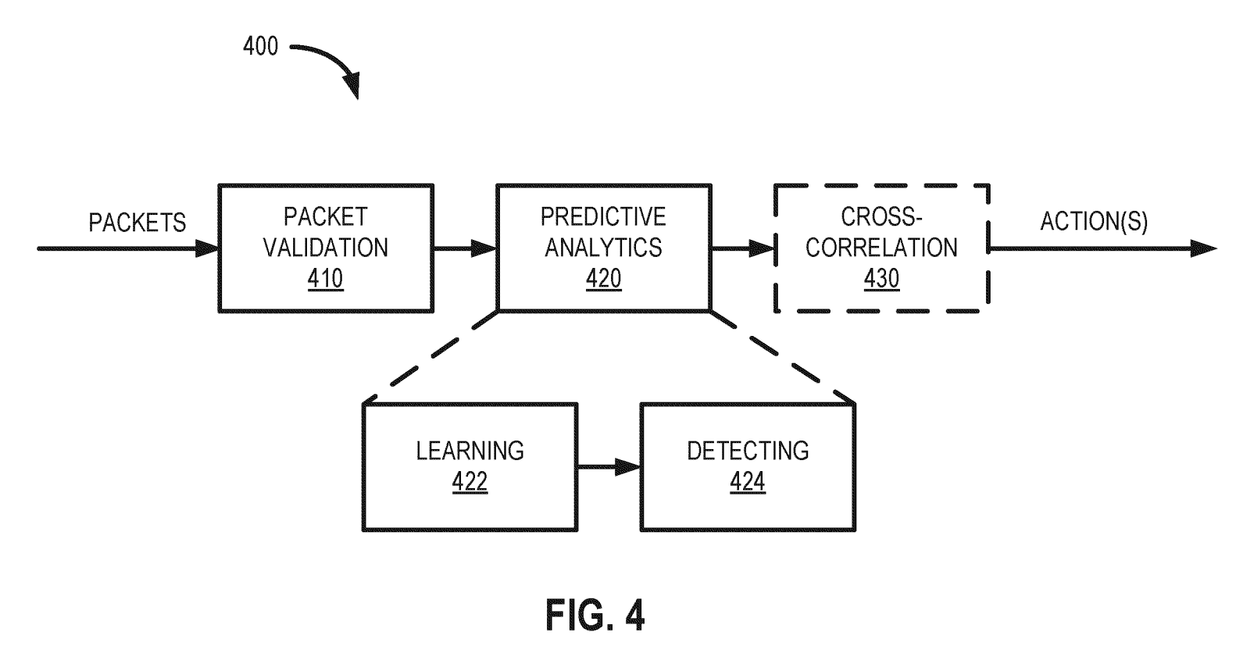
FIG. 4 is a flow diagram illustrating an example approach to attack detection, according to one or more embodiments of the present disclosure.

FIG. 4 is a flow diagram that illustrates a staged approach 400 to attack detection in accordance with particular embodiments of the present disclosure. The approach 400 illustrated in FIG. 4 includes a packet validation stage 410 and a predictive analytics stage 420. In some embodiments, the approach 400 further comprises a cross-correlation stage 430.

In the packet validation stage 410, one or more checks, validations, and/or adaptations (decryptions) may be performed on received packets. For example, packets may be decrypted checksummed, and/or checked for missing or invalid values. Particular problems with a packet may be appropriately addressed, e.g., by silently discarding a packet, triggering a retransmission request, and/or triggering an alarm or other notification.

The predictive analytics stage 420 may leverage regression techniques (e.g., an Autoregressive Integrated Moving Average (ARIMA)) to forecast trends that are useful for anomaly detection based on information obtained during the packet validation stage 410. For example, the behavior of the time-varying sequence number may be stationarized and reduction in sequence numbers deviation identified in any time interval may be treated as potential or actual evidence of an attack. In this regard, the predictive analytics stage may include a learning phase 422 in which baseline behavior is determined over one or more time intervals, followed by a detection phase 424 in which deviation from the baseline may be treated as an actual or potential attack.

In the cross-correlation stage 430, information learned from the predictive analytics stage 420 with respect to a given TCP session may be cross-correlated with that of one or more other sessions. In this regard, sequence number behavior observed in a given TCP stream that is inconsistent with that of other TCP streams may be treated as an actual or potential attack.

The approach 400 may include both localized and centralized aspects in which different aspects of the approach are implemented. The example computing system 500 illustrated in FIG. 5 employs such an approach. According to the example of FIG. 5, the computing system 500 executes a plurality of virtual functions 510a-d (e.g., one or more virtual machines and/or one or more 3GPP virtualized network functions), each of which is an endpoint 110 or intermediary 130 of one or more TCP sessions. Each of the virtual functions 510a-d may perform one or more of the localized functions. The computing system 500 also executes a security controller 520, which may perform one or more of the centralized functions.

Figure 5:
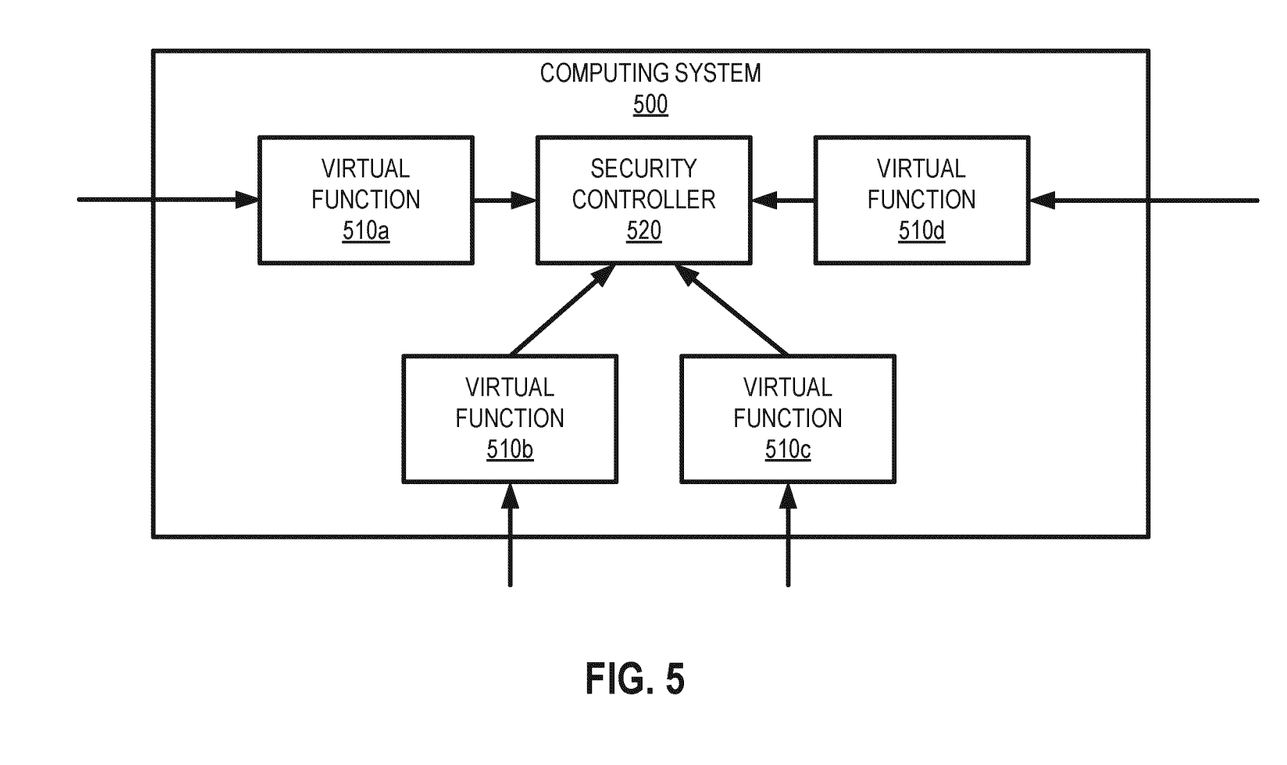
FIG. 5 is a schematic block diagram illustrating an example computing system, according to one or more embodiments of the present disclosure.

A virtual function 510 may perform one or more packet validation 410 functions. According to one such example, a virtual function 510 may use a dedicated counter that increments each time a nonsequential packet is received. Periodically, this jump counter may then be forwarded to the security controller 520 for use by one or more predictive analytics 420 functions. For example, the jump counters received over a plurality of periodic intervals may be used to predict future likely values of the jump counter, and a jump counter of a subsequent interval deviating from this prediction by more than a threshold amount may be treated as potential or actual evidence of an attack. More specifically, one or more jump counters may be received during the learning phase 422 of the predictive analytics 420 stage to generate the prediction for future likely values, and during the detection phase, deviations may be treated as actual or potential attacks while the security controller continues to refine its predictions each time a new jump counter value is received.

This process is not limited to simply operating on the jump counter. Indeed, a similar process may be used to evaluate the extent to which the sequence numbers of nonsequential packets vary in a given interval of time based on a baseline calculated from the behavior observed in previous intervals. In this regard, sequence number jumps that tend to be less random than usual (i.e., the sequence numbers received during a given interval of time lack sufficient variation as compared to a trend established by previous intervals), the security controller 520 may treat such behavior as potential or actual evidence of an attack. Similarly, sequence number jumps that tend to be more random than usual (i.e., the sequence numbers received during a given interval of time vary to a much greater extent as compared to a trend established by previous intervals), the security controller 520 may additionally or alternatively treat such behavior as potential or actual evidence of an attack.

It should be noted that, although not illustrated in FIG. 5, according to some embodiments of the computing system 500, the virtual functions 510a-d and the security controller 520 execute on one or more computing devices comprised in computing system 500. Thus, embodiments of the present disclosure may be applied to distributed computing architectures in which the computing system 500 comprises distinct computing devices that are interconnected by any appropriate network (e.g., Ethernet, radio, optical) using any appropriate network topology (e.g., full mesh, star, daisy-chain).

Figure 6:
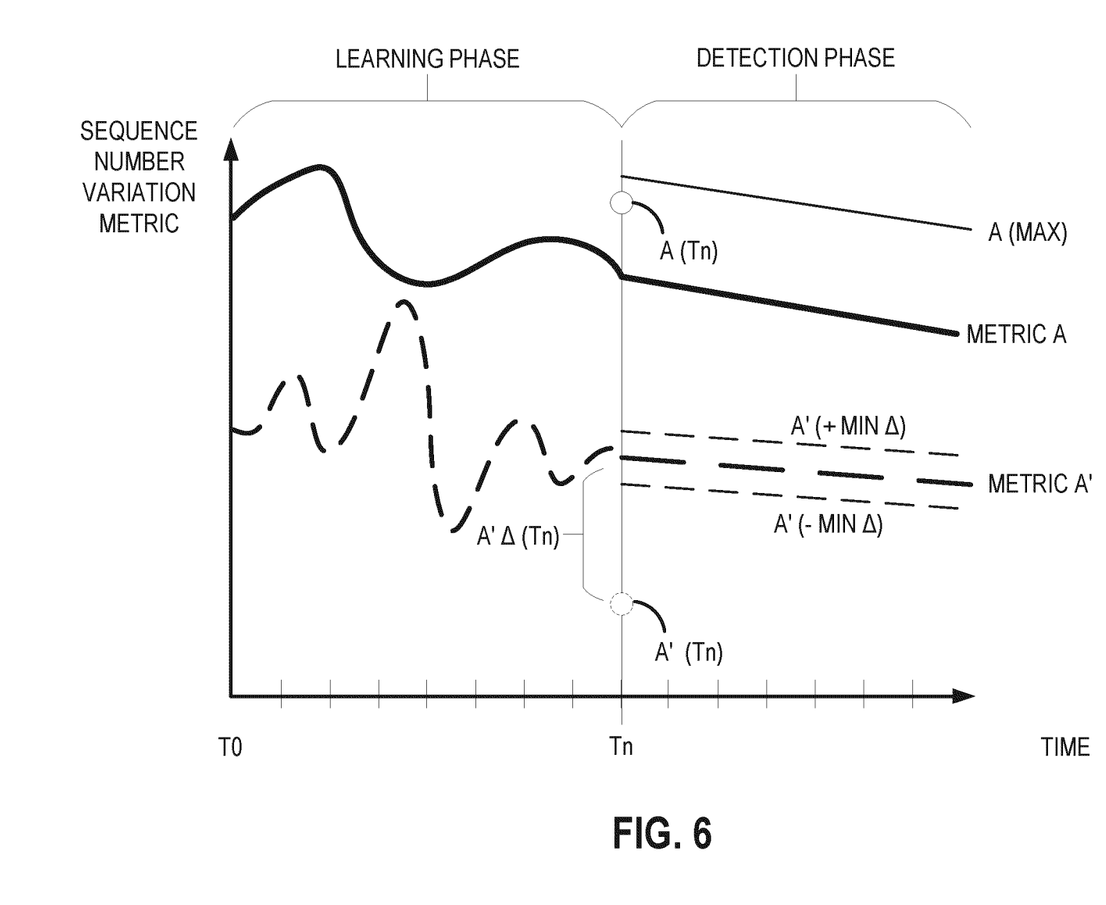
FIG. 6 is a graph that illustrates an example of sequence number variation metrics as observed and predicted over time, according to one or more embodiments of the present disclosure.

FIG. 6 is a graph that illustrates an example of sequence number variation metrics A and A', each of which is calculated based on the sequence numbers of nonsequential packets received over time. Metric A' in particular may, in some embodiments, be a second-order metric of metric A, an example of which will be explained below.

The graph reflects the use of machine learning techniques according to embodiments in which regression analysis is performed to make predictions about future outcomes. Such an approach may be particularly powerful when the behavior being analyzed is generally regular and repetitive. Accordingly, the graph depicts data observed throughout a learning phase in which, e.g., such regularities or other behaviors may serve as a basis for making predictions about subsequent behavior in a later detection phase. The learning phase occurs over n periods of time (i.e., from T0 to Tn). Behavior observed during the learning phase has been used to calculate a trend that predicts expectations during a detection phase in the intervals of the detection phase subsequent to Tn.

In this example, at the end of any period Tn or later, an observed metric A that is higher than the trend by a threshold A (max) is treated as evidence of an attack. For example, the value A (Tn) may be a value that represents the number of non-sequential packets received during the period ending at Tn. It may be expected that the number of sequence number jumps in any interval of time will not be excessive, as genuine packets should generally arrive in sequence. Therefore, at time Tn, the number of sequence number jumps received during the corresponding period may be expected to be less than the threshold A (max). In this particular example, the threshold A (max) is a dynamically changing value having the same slope as the metric A value prediction trend. In some embodiments, the threshold may additionally or alternatively be dynamically configurable. Because the number of non-sequential packets received for the interval ending at time Tn in this example is less than A (max), the value of A (Tn) may be deemed in conformance with expectations. Had the value of A (Tn) been above A (max), the computing system 500 may enter a warning state, generate alerts, notify an administrator or take other action to protect against an actual or potential TCP session hijacking attack.

FIG. 6 also shows the calculation of metric A' over time. Although this example illustrates metric A' being calculated over the same time intervals as metric A, the calculation of these metrics may be activated and/or deactivated at different times according to other embodiments. Indeed, in some particular embodiments, detection that metric A is non-conformant with expectations may trigger activation of metric A' calculations. Correspondingly, detection that metric A is within expectations may trigger deactivation of metric A' calculations. In either case, observation that behavior is non-conformant or conformant for more than a threshold number of intervals may be required to trigger activation or deactivation, respectively, of the metric calculation, according to some embodiments.

In this example, if metric A' is observed to be different from the corresponding trend by less than a threshold, the computing system 500 is configured to treat this as evidence of an attack. For example, it is generally expected that the mean and/or mode of the sequence number jumps observed over a given interval of time should not stay constant when packet traffic is genuine. Therefore, in this example, a mean and/or a mode that is less than some minimum threshold difference from the trend may be treated as evidence of non-random packet spoofing. Because metric A' observed at time Tn in this example is greater than a threshold difference from the predicted trend (and in particular, less than mean (−min Δ)), the value of metric A' (Tn) may be deemed in conformance with expectations. Had the value of metric A' (Tn) been within mean (+min Δ) and mean (−min Δ), the computing system 500 may have generated alerts, notified an administrator, or have taken other action to protect against an actual or potential TCP session hijacking attack.

It should be noted that the examples shown in FIG. 6 are just a small set of examples with respect to how analytics may be performed based on sequence numbers. In particular embodiments, sequence number variation is expected to be generally non-constant, i.e., regardless of whether mean and/or mode values are considered. Accordingly, variation of less or more than a threshold amount may be treated as evidence of an attack depending on the metric evaluated. These thresholds may also vary depending on network conditions and/or one or more other factors that might influence sequence number variation. For example, a known network congestion issue may result in expected mean and/or modal values that are more constant than usual (e.g., due to an expectation of increased packet drops). Statistical metrics other than mean and mode (e.g., standard distribution, range) may also be evaluated. In short, any of the metrics described herein may be evaluated for being above, below, or within threshold constraints as may be appropriate.

Having performed one or more predictive analytics 420 functions (e.g., such as that discussed above with respect to FIG. 6), the security controller 520 may (in some embodiments) perform one or more cross-correlation 430 functions with respect to different TCP sessions. For example, the security controller 520 may determine whether any of the predictions with respect to any stream from any of the virtual functions 510a-d is more than a threshold number of standard deviations from the group, and if so, treat this as evidence of an actual or potential attack. Therefore, it is possible that a TCP session may not be deemed under attack based on predictive analytics performed based solely on that session's observed metrics, but may be deemed under attack when that session's metrics are compared to those of other sessions.

In some embodiments, one or more functions of the predictive analytics stage 420, the cross-correlation stage 430, or both are activated in response to detecting potential evidence of an attack. That is, in some embodiments, more information may be required in order to determine that an attack is actually occurring. Accordingly, responsive to detecting suspicious behavior with respect to a first metric, the computing device 500 may enter a warning state in which one or more additional checks are performed (e.g., using one or more further metrics).

For example, in response to detecting that the number of non-sequential packets received in a given interval has exceeded a threshold, the calculation of one or more sequence number variation metrics may commence for one or more subsequent time intervals. For example, mean and/or mode metrics may be calculated with respect to a single TCP session, and in some embodiments be cross-correlated with other TCP sessions. Aberrant behavior in one or more of these additional variation metrics may be treated as an attack on the TCP session. In some embodiments, should such aberrant behavior fail to occur within a threshold number of time intervals, calculation of these additional analytics may be suspended.

One or more of the features described above may be employed in order to provide a TCP session hijacking attack detection solution that is scalable to support a large number of established TCP sessions and/or a high amount of packet traffic. For example, in some embodiments, a more rudimentary analysis is periodically performed, and responsive to that analysis triggering the computing device 500 into a warning state, further analysis is performed periodically, e.g., until the conditions that triggered the warning state abate. In particular, some embodiments may include observing that the conditions that triggered the warning state has abated for at least a threshold number of consecutive intervals before the more advanced analytics are suspended. Indeed, the thresholds and hysteresis window for may be adjusted (e.g., programmable) to be stricter or more relaxed as appropriate for the scale of the computing system 500, e.g., to increase or decrease the frequency in which additional statistical data is generated.

Moreover, one or more cross-correlation functions may compare one or more readily calculable statistical indicators (such as mean and modal values of one or more fields in TCP packets 200) to one or more corresponding thresholds. As these computations are generally computationally inexpensive, scaling as the number of virtual functions 510 increases may be readily accomplished. This may be further advantageous in some embodiments, as the additional scale may enhance opportunities to cross-correlate the behavior of individual TCP sessions with the behavior of other TCP sessions established with other endpoints 110 and/or passing through other intermediaries 130.

Further still, particular embodiments may separate different stages of the solution for execution at either a localized or centralized location, e.g., so that when more elaborate metrics need to be computed and analyzed, these more elaborate computations are not replicated as the number of local functions increases. Rather, such second-level computations may instead be handled by a centralized security controller 520, which may (for example) have dedicated resources for handling these elaborations without impacting virtual function performance.

Further, leveraging a security controller 520 at a centralized location and having visibility to the traffic characteristics of the other network entities may enable embodiments to advantageously cross-correlate different anomalies arising in the same timeframe and involving different virtual functions 510 of the network. Among other things, this may enable the computing system 500 to enter the warning state by a correspondence of lower thresholds without impacting overall performance. In particular, this may enhance detection time without increasing the rate of false positives. Thus, the cross-correlations performed by the security controller may be more complex and refined than what can be discerned through localized anomaly detection.

Figure 7:
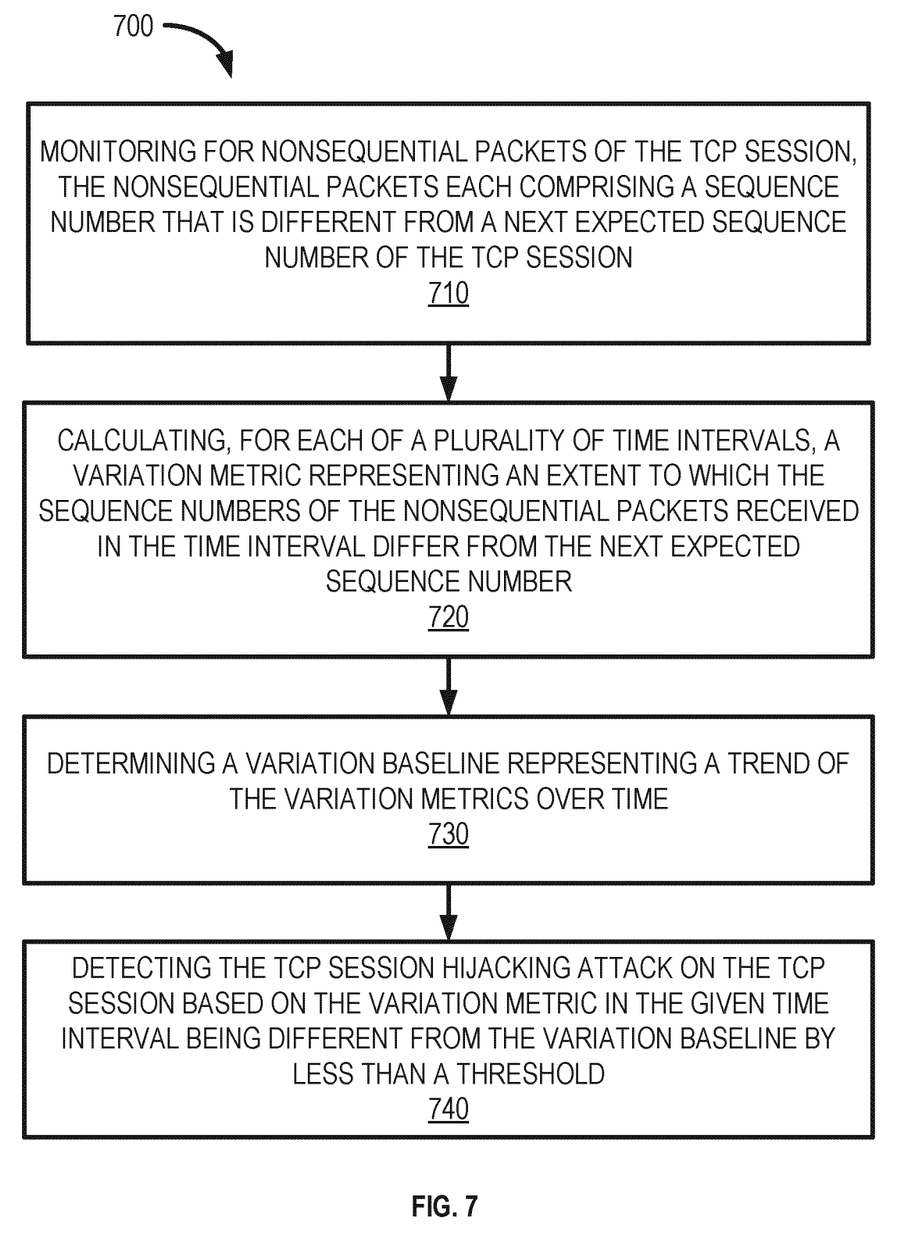
FIG. 7 is a flow diagram illustrating an example method of detecting a TCP session hijacking attack on a TCP session, according to one or more embodiments of the present disclosure.

In view of the above, FIG. 7 illustrates an example method 700 of detecting a TCP session hijacking attack on a TCP session. The method 700 is implemented by a computing system 500 and comprises monitoring for nonsequential packets 200 of the TCP session (block 710). The nonsequential packets 200 each comprise a sequence number 220 that is different from a next expected sequence number of the TCP session. The method 700 further comprises calculating, for each of a plurality of time intervals, a variation metric representing an extent to which the sequence numbers 220 of the nonsequential packets 200 received in the time interval differ from the next expected sequence number (block 720). The method 700 further comprises determining a variation baseline representing a trend of the variation metrics over time (block 730). The method 700 further comprises detecting the TCP session hijacking attack on the TCP session based on the variation metric in a given time interval being different from the variation baseline by less than a threshold (block 740).

Figure 8:
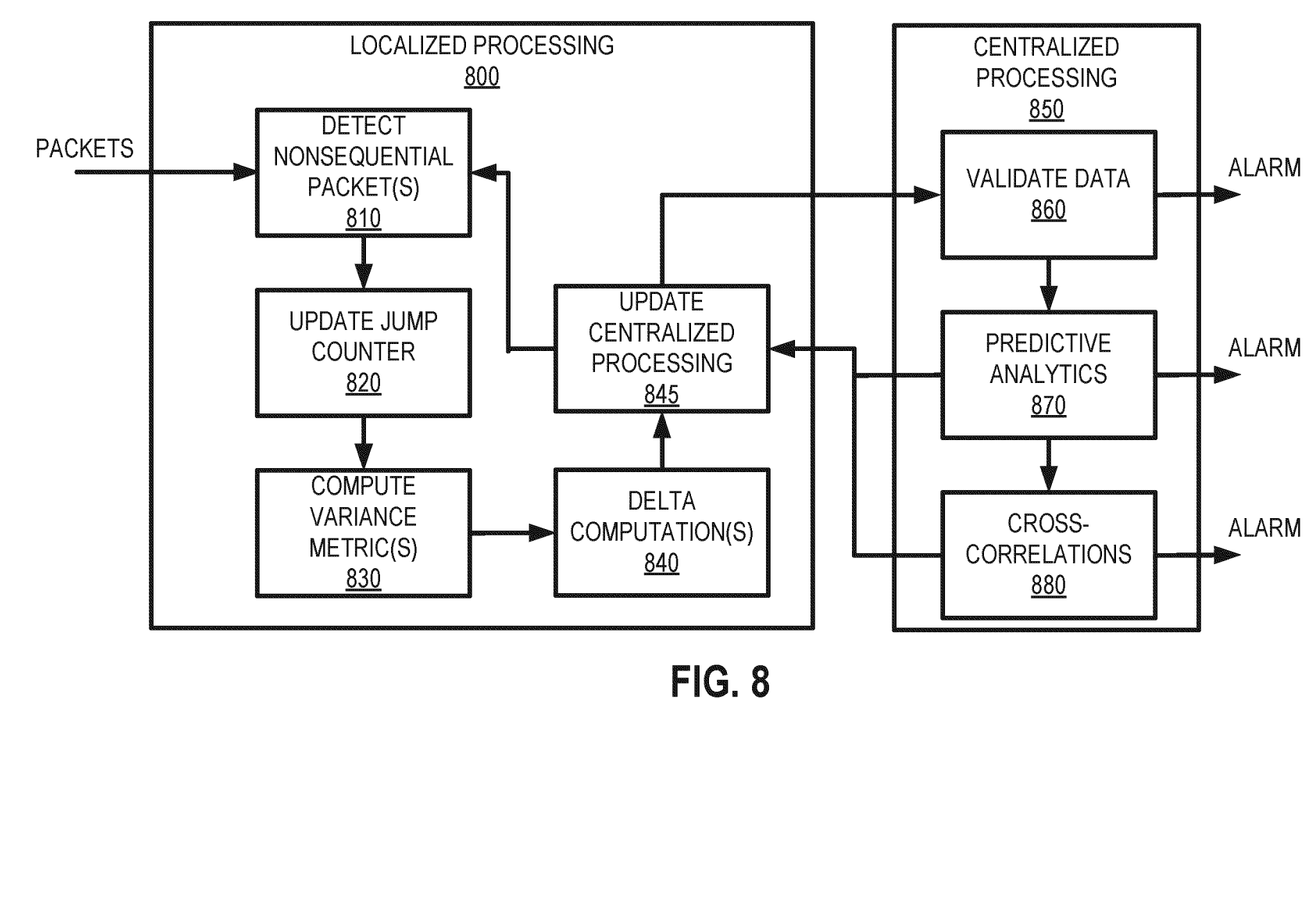
FIG. 8 is a flow diagram illustrating an example distribution of TCP session analysis and hijacking attack detection tasks as implemented by one or more computing systems according to one or more embodiments of the present disclosure.

FIG. 8 is a flow diagram illustrating an example distribution of TCP session analysis and hijacking attack detection tasks into localized processing 800 and centralized processing 850 components, as implemented by one or more computing systems 500. It should be noted that although the steps illustrated in FIG. 8 are largely depicted as sequential, this is for clarity of explanation. In fact, many of the elements illustrated in FIG. 8 may be performed in parallel or in a variety of other sequences in accordance with other embodiments. Further, other embodiments include any of the localized processing 800 elements performed as part of the centralized processing 850. Correspondingly, other embodiments include any of the centralized processing 850 elements performed as part of the centralized processing 800.

In this example, packets 200 of a TCP session are an input to one or more localized processing 800 elements. In some embodiments, such localized processing 800 may be co-located (or implemented within) a virtual function 510 of the computing system 500, and provide data used by the centralized processing 850 performed, e.g., by a security controller 520. In general, it may be advantageous in some embodiments for localized processing 800 to be used for tasks that are relatively computationally inexpensive, whereas more complex tasks may be advantageous to perform through centralized processing 850. In this way, as additional virtual functions 510 and TCP sessions are added to the computing system 500, the computational burden may scale in a relatively controlled fashion.

As part of the localized processing 800 of this example, in response to detecting nonsequential packets (block 810), a jump counter is updated (block 820) to reflect the number of nonsequential packets received. In addition, one or more variance metric(s) are computed (e.g., mean, mode) that reflect an extent to which the sequence numbers 220 of the nonsequential packets are different from the next expected sequence number of the TCP session (block 830). One or more delta computations are performed that compare the jump counter and/or variance metric(s) calculated in a current time interval against corresponding data obtained in one or more previous intervals (block 840).

For example, the mean and mode values of sequence number jumps for received packets may be computed every N-minutes. Once computed, the difference (i.e., delta) between each of these values as compared to those of one or more previous N-minute periods may additionally be determined.

These various metrics computed locally (e.g., the jump counter, variance metrics, and/or calculated differences) may be forwarded on for use in centralized processing 850, e.g., as performed by a security controller 520 (block 845). Based on these forwarded metrics, centralized processing may perform one or more attack detection tasks. In particular, centralized processing 850 may be updated periodically with these metrics, and detection tasks may be performed each period.

In this example, centralized processing 850 include the performance of certain data validation (block 860), predictive analytics (block 870), and cross-correlation (block 880) tasks, any of which may send an alarm, e.g., to a network management system. In this example, the predictive analytics and cross-correlations (870, 880) aspects may each additionally or alternatively trigger a warning state, and notify localized processing 800 accordingly. Localized processing 800 may change the manner in which centralized processing 850 is updated accordingly.

For example, when the computing system 500 is in the warning state, localized processing 800 may refrain from sending one or more of the above-discussed metrics and/or may avoid performing one or more tasks. In this way, computing resources may be conserved when there is insufficient evidence that an attack may be occurring.

Although embodiments of the present disclosure require detecting an anomaly in one or more metrics before enabling further analytics, in general, it is advantageous for the metrics calculations and analytics performed to be lightweight and efficient to the extent possible. For example, during the attack warning state, the operations required in many of the examples discussed above are simple comparisons. In one such example, if the mean and modal values received by the central processing 850 functions are within a configurable window of values, an alarm may be sent that the TCP session is under attack. In this regard, values within the window may indicate that these values are nearly constant as compared to one or more previous intervals, and therefore seems to reflect malicious activity. Further, a programmable hysteresis of M intervals of time may be configured to protect against random false positives (i.e., to avoid triggering an alert for infrequent cases in which the mean and mode values are constant in the absence of an attack).

As previously mentioned above, one, some, or all of the functions described above may be implemented by a computing system 500. Such a computing system 500 may be implemented according to the hardware illustrated in FIG. 9. The example hardware of FIG. 6 comprises processing circuitry 910, memory circuitry 920, and interface circuitry 930. The processing circuitry 910 is communicatively coupled to the memory circuitry 920 and the interface circuitry 930, e.g., via one or more buses. The processing circuitry 910 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 910 may be programmable hardware capable of executing software instructions 960 stored, e.g., as a machine-readable computer program in the memory circuitry 920. The memory circuitry 920 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

Figure 9:
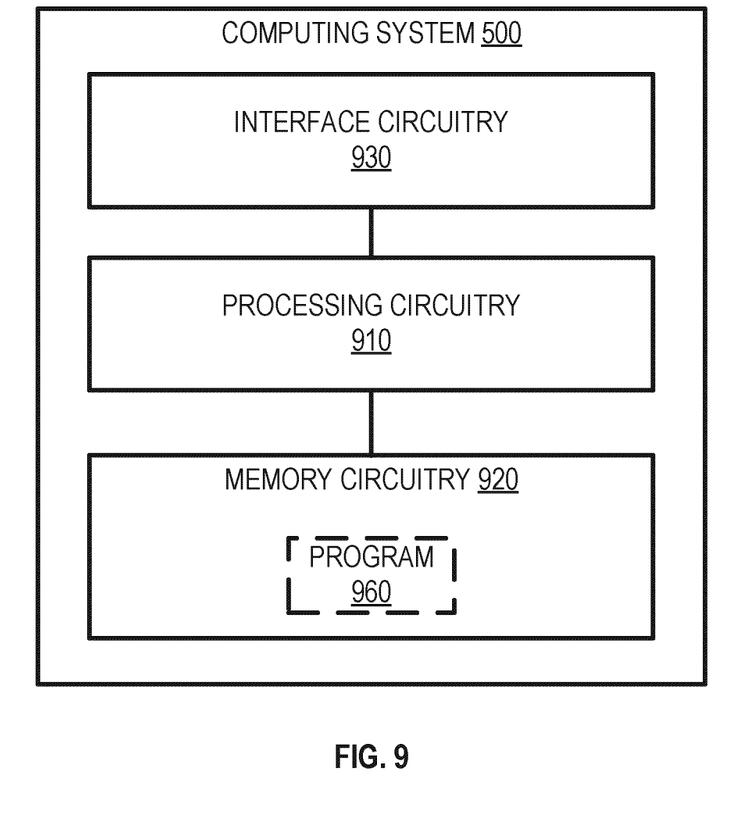
FIG. 9 is a schematic block diagram illustrating an example computing system, according to one or more embodiments of the present disclosure.

The interface circuitry 930 may be a controller hub configured to control the input and output (I/O) data paths of the computing system 500. Such I/O data paths may include data paths for exchanging signals over a communications network 105 and data paths for exchanging signals with a user. For example, the interface circuitry 930 may comprise a transceiver configured to send and receive communication signals over one or more of a cellular network, Ethernet network, or optical network. The interface circuitry 930 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 930 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 930 may be implemented as a unitary physical component, or as a plurality of physical components that are contiguously or separately arranged, any of which may be communicatively coupled to any other, or may communicate with any other via the processing circuitry 910. For example, the interface circuitry 930 may comprise output circuitry (e.g., transmitter circuitry configured to send communication signals over the communications network) and input circuitry (e.g., receiver circuitry configured to receive communication signals over the communications network). Similarly, the output circuitry may comprise a display, whereas the input circuitry may comprise a keyboard. Other examples, permutations, and arrangements of the above and their equivalents will be readily apparent to those of ordinary skill.

According to embodiments of the hardware illustrated in FIG. 9, the interface circuitry 930 is configured to receive a plurality of packets 200 of a TCP session. The processing circuitry 910 is configured to monitor for nonsequential packets of the TCP session. The nonsequential packets each comprise a sequence number 220 that is different from a next expected sequence number of the TCP session. The processing circuitry 910 is further configured to calculate, for each of a plurality of time intervals, a variation metric representing an extent to which the sequence numbers 220 of the nonsequential packets received in the time interval differ from the next expected sequence number. The processing circuitry 910 is further configured to determine a variation baseline representing a trend of the variation metrics over time, and detect the TCP session hijacking attack on the TCP session based on the variation metric in a given time interval being different from the variation baseline by less than a threshold.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of detecting a Transmission Control Protocol (TCP) session hijacking attack on a TCP session, the method being implemented by a computing system and comprising:
    monitoring for nonsequential packets of the TCP session, the nonsequential packets each comprising a sequence number that is different from a next expected sequence number of the TCP session;
    calculating, for each of a plurality of time intervals, a variation metric representing an extent to which the sequence numbers of the nonsequential packets received in a time interval differ from the next expected sequence number;
    determining a variation baseline representing a trend of the variation metrics over time;
    detecting the TCP session hijacking attack on the TCP session based on the variation metric in a given time interval being different from the variation baseline by less than a threshold.

2. The method of claim 1, wherein calculating the variation metric for each of the plurality of time intervals comprises calculating:
    a mean difference between the next expected sequence number and the sequence numbers of the nonsequential packets received in the time interval; or
    a modal difference between the next expected sequence number and the sequence numbers of the nonsequential packets received in the time interval.

3. The method of claim 2, further comprising calculating both the mean difference and the modal difference for each of the time intervals.

4. The method of claim 3, further comprising comparing the mean difference and the modal difference of the given time interval to the mean difference and the modal difference of at least one time interval previous to the given time interval.

5. The method of claim 1, wherein:
the plurality of time intervals further comprises one or more time intervals subsequent to the given time interval;
detecting the TCP session hijacking attack on the TCP session is further based on the variation metric in the subsequent time intervals being different from the variation baseline by less than the threshold.

6. The method of claim 5, wherein detecting the TCP session hijacking attack is further based on the variation metric being different from the variation baseline by less than the threshold for more than a configurable number of the time intervals.

7. The method of claim 1, further comprising commencing the calculating of the variation metric for each of the plurality of time intervals in response to detecting that, in a time interval preceding the plurality of time intervals, more than a threshold number of the nonsequential packets was received.

8. The method of claim 1, further comprising commencing the calculating of the variation metric for each of the plurality of time intervals in response to detecting that, in a time interval preceding the plurality of time intervals, the nonsequential packets received for the TCP session are greater in number than for one or more other TCP sessions by a threshold amount.

9. The method of claim 1, further comprising refraining from calculating the variation metric for one or more time intervals in which sequence number variation is different from the variation baseline by more than the threshold.

10. The method of claim 9, wherein the refraining from calculating the variation metric for the one or more time intervals in which the sequence number variation is different from the variation baseline by more than the threshold is responsive to the sequence number variation being different from the variation baseline for at least a configurable number of consecutive time intervals.

11. A computing system comprising:
interface circuitry configured to receive a plurality of packets of a Transmission Control Protocol (TCP) session;
processing circuitry communicatively coupled to the interface circuitry and configured to:
monitor for nonsequential packets of the TCP session, the nonsequential packets each comprising a sequence number that is different from a next expected sequence number of the TCP session;
calculate, for each of a plurality of time intervals, a variation metric representing an extent to which the sequence numbers of the nonsequential packets received in a time interval differ from the next expected sequence number;
determine a variation baseline representing a trend of the variation metrics over time;
detect a TCP session hijacking attack on the TCP session based on the variation metric in a given time interval being different from the variation baseline by less than a threshold.

12. The computing system of claim 11, wherein to calculate the variation metric for each of the plurality of time intervals, the processing circuitry is configured to calculate:
a mean difference between the next expected sequence number and the sequence numbers of the nonsequential packets received in the time interval; or
a modal difference between the next expected sequence number and the sequence numbers of the nonsequential packets received in the time interval.

13. The computing system of claim 12, wherein the processing circuitry is further configured to calculate both the mean difference and the modal difference for each of the time intervals.

14. The computing system of claim 13, wherein the processing circuitry is further configured to compare the mean difference and the modal difference of the given time interval to the mean difference and the modal difference of at least one time interval previous to the given time interval.

15. The computing system of claim 11, wherein:
the plurality of time intervals further comprises one or more time intervals subsequent to the given time interval;
the processing circuitry is further configured to detect the TCP session hijacking attack on the TCP session based on the variation metric in the subsequent time intervals being different from the variation baseline by less than the threshold.

16. The computing system of claim 15, wherein the processing circuitry is further configured to detect the TCP session hijacking attack based on the variation metric being different from the variation baseline by less than the threshold for more than a configurable number of the time intervals.

17. The computing system of claim 11, wherein the processing circuitry is further configured to commence the calculating of the variation metric for each of the plurality of time intervals in response to detecting that, in a time interval preceding the plurality of time intervals, more than a threshold number of the nonsequential packets was received.

18. The computing system of claim 11, wherein the processing circuitry is further configured to commence the calculating of the variation metric for each of the plurality of time intervals in response to detecting that, in a time interval preceding the plurality of time intervals, the nonsequential packets received for the TCP session are greater in number than for one or more other TCP sessions by a threshold amount.

19. The computing system of claim 11, wherein the processing circuitry is further configured to refrain from calculating the variation metric for one or more time intervals in which sequence number variation is different from the variation baseline by more than the threshold.

20. The computing system of claim 19, wherein the processing circuitry is further configured to refrain from calculating the variation metric for the one or more time intervals in which the sequence number variation is different from the variation baseline by more than the threshold in response to the sequence number variation being different from the variation baseline for at least a configurable number of consecutive time intervals.

21. A non-transitory computer readable medium storing a computer program product for controlling a computing system, the computer program product comprising software instructions that, when run on the computing system, cause the computing system to:
monitor for nonsequential packets of the TCP session, the nonsequential packets each comprising a sequence number that is different from a next expected sequence number of the TCP session;
calculate, for each of a plurality of time intervals, a variation metric representing an extent to which the sequence numbers of the nonsequential packets received in a time interval differ from the next expected sequence number;
determine a variation baseline representing a trend of the variation metrics over time;

detect the TCP session hijacking attack on the TCP session based on the variation metric in a given time interval being different from the variation baseline by less than a threshold.

* * * * *